(12) United States Patent
Liang

(10) Patent No.: US 6,752,466 B2
(45) Date of Patent: Jun. 22, 2004

(54) PROTECTIVE DEVICE FOR FASTENING DETACHABLY TO A SHOULDER HARNESS FOR USE IN A MOTOR VEHICLE

(75) Inventor: Lien-Feng Liang, Changhua Hsien (TW)

(73) Assignee: Yet Chang Mobile Goods Co., Ltd., Changhua Hsien (TW)

( * ) Notice: Subject to any disclaimer, the term of this patent is extended or adjusted under 35 U.S.C. 154(b) by 45 days.

(21) Appl. No.: 10/165,781

(22) Filed: Jun. 10, 2002

(65) Prior Publication Data

US 2003/0227214 A1 Dec. 11, 2003

(30) Foreign Application Priority Data

Oct. 9, 2001 (TW) .......................................... 090217399

(51) Int. Cl.⁷ ............................................... B60R 22/00

(52) U.S. Cl. ........................ 297/482; 297/483; 280/808

(58) Field of Search ................................ 297/482, 483; 280/808, 801.1

(56) References Cited

U.S. PATENT DOCUMENTS

| | | | | |
|---|---|---|---|---|
| 4,969,663 A | * | 11/1990 | Nowacki | 280/808 |
| 5,215,333 A | * | 6/1993 | Knight | 280/801.1 |
| 5,322,349 A | * | 6/1994 | Gianino | 297/482 |
| 5,463,369 A | * | 10/1995 | Lamping | 340/384.7 |
| 5,566,871 A | * | 10/1996 | Weintraub | 224/264 |
| 5,892,436 A | * | 4/1999 | Blackburn et al. | 340/457.1 |
| 6,017,094 A | * | 1/2000 | Syiek | 297/482 |
| 6,102,440 A | * | 8/2000 | Bergkessel | 280/808 |
| 6,142,575 A | * | 11/2000 | Patterson | 297/482 |
| 6,273,467 B1 | * | 8/2001 | Berke et al. | 280/751 |
| 6,409,271 B1 | * | 6/2002 | Caramanis | 297/482 |

* cited by examiner

Primary Examiner—Peter M. Cuomo
Assistant Examiner—Stephanie Harris
(74) Attorney, Agent, or Firm—Harrison & Egbert

(57) ABSTRACT

A protective device is detachably attached to a shoulder harness of the automotive vehicle and is formed of a main body and a panel. The main body has a softness and is provided with the Velcro, device to facilitate the fastening and the unfastening of the protective device with the shoulder harness. The panel is attached to the outer surface of the main body and is provided with a light-emitting apparatus and an attention-drawing mark printed thereon.

1 Claim, 5 Drawing Sheets

PROTECTIVE DEVICE FOR FASTENING DETACHABLY TO A SHOULDER HARNESS FOR USE IN A MOTOR VEHICLE

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to the accessories of an automobile, and more particularly to a protective device which is detachably fastened with a shoulder harness of the automobile.

BACKGROUND OF THE INVENTION

The conventional shoulder harness is a restraining device comprising an anchored strap passing diagonally across the chest of a driver or passenger of the automobile. The conventional shoulder harness is often a contributing factor for causing bodily discomfort to its user, especially in a long trip. In addition, the conventional shoulder harness is so designed as to have only one purpose or use.

BRIEF SUMMARY OF THE INVENTION

The primary objective of the present invention is to provide a shoulder harness with a protective device which serves to broaden the purpose of the shoulder harness.

The protective device of the present invention comprises a main body, and a panel attached to the main body and provided with a light-emitting apparatus. The main body is detachably fastened to the shoulder harness to alleviate the bodily discomfort of a user of the shoulder harness. The panel is designed to draw attention in case of an emergency.

The features and the functions of the present invention will be more readily understood upon a thoughtful deliberation of the following detailed description of the present invention with reference to the accompanying drawings.

DETAILED DESCRIPTION OF THE INVENTION

Figure 1:
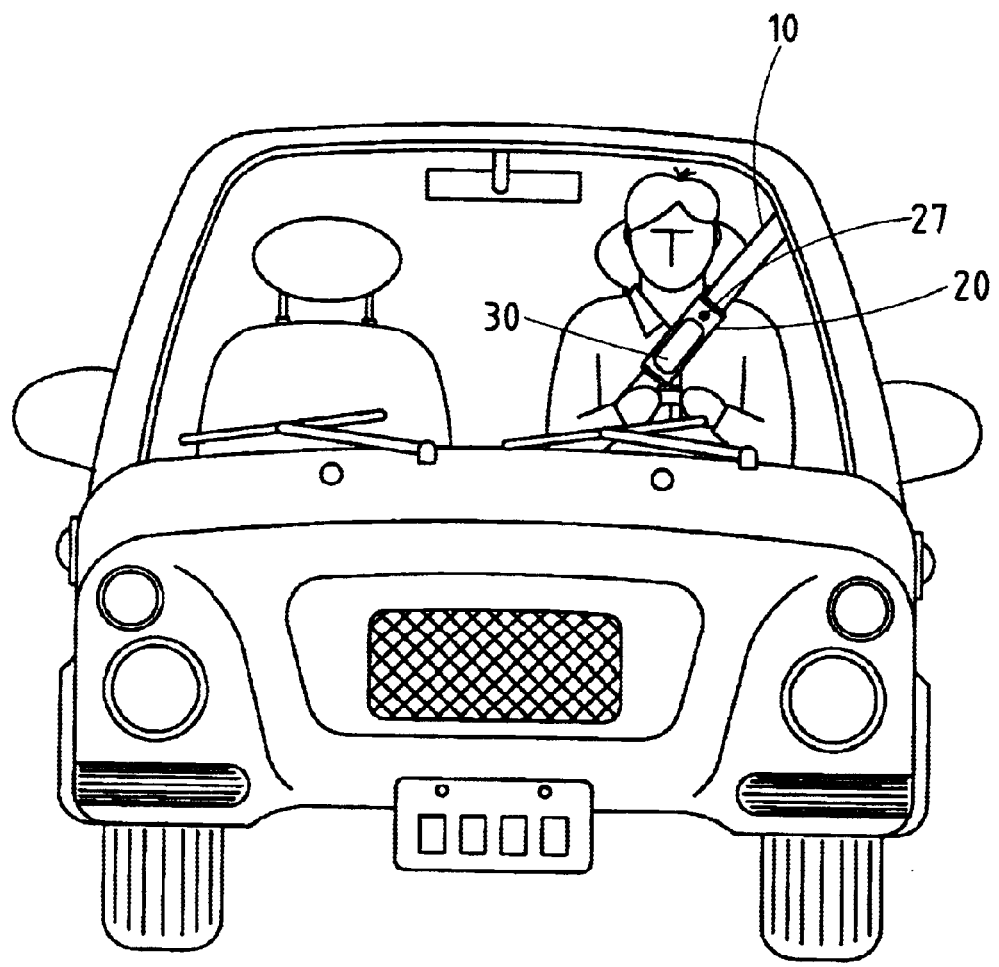
FIG. 1 shows a schematic view of the present invention in use.
Figure 2:
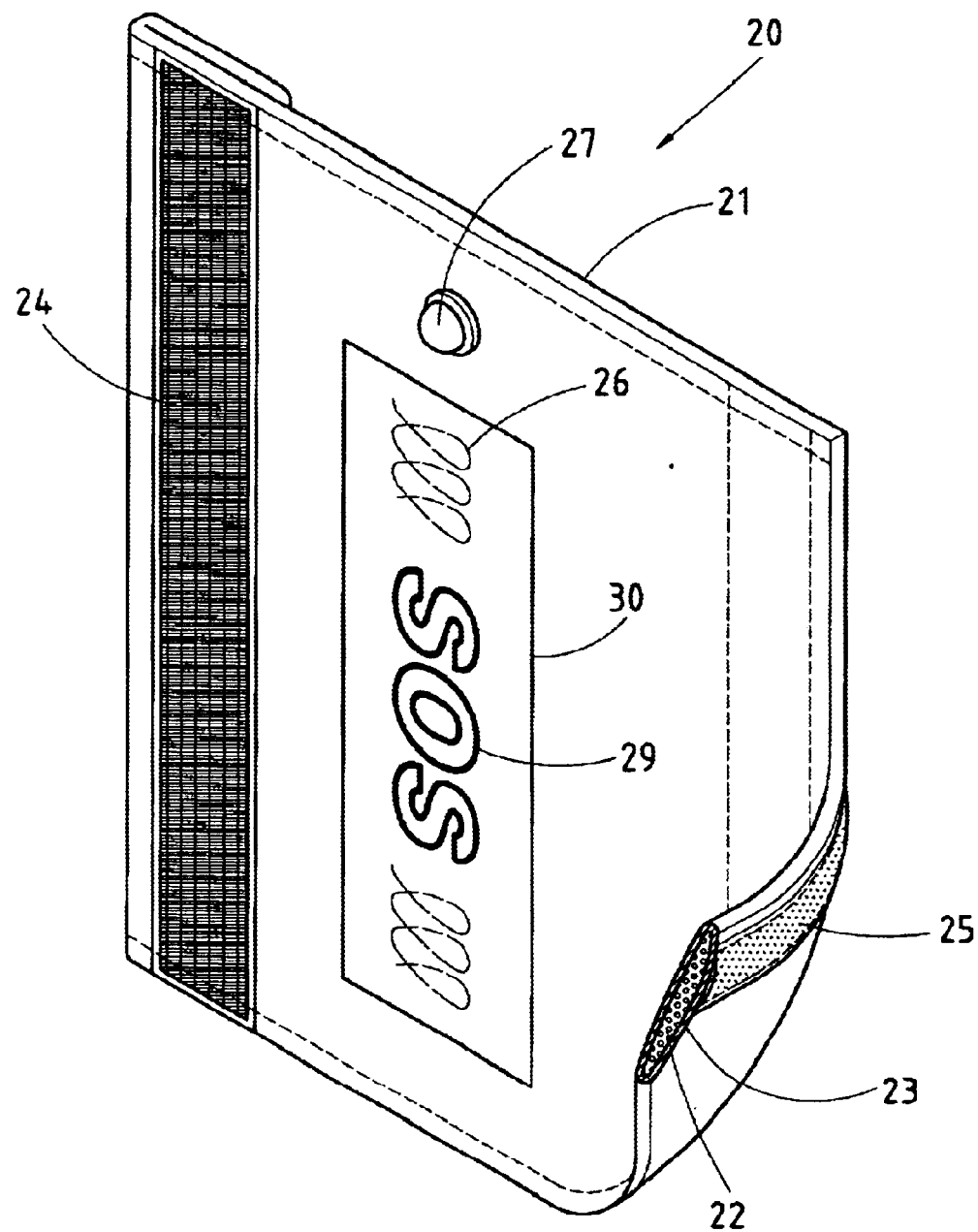
FIG. 2 shows a perspective view of the present invention.
Figure 3:
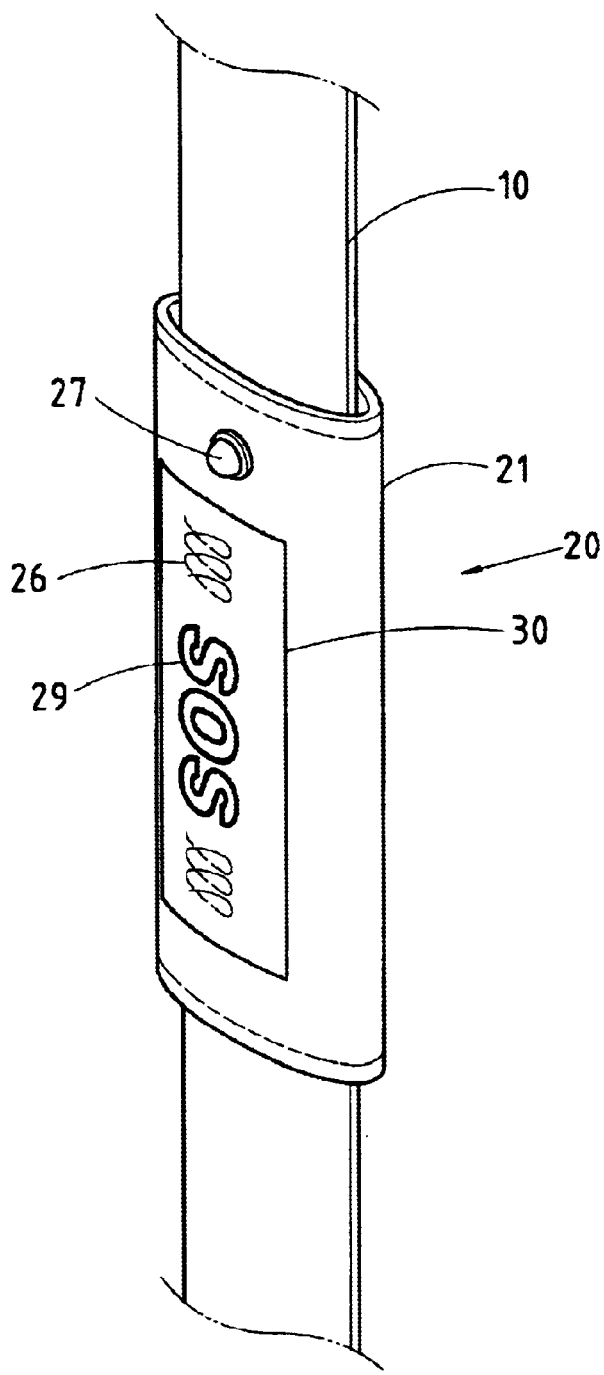
FIG. 3 shows a schematic view of the present invention and a shoulder harness to which the a present invention detachably attached.
Figure 4:
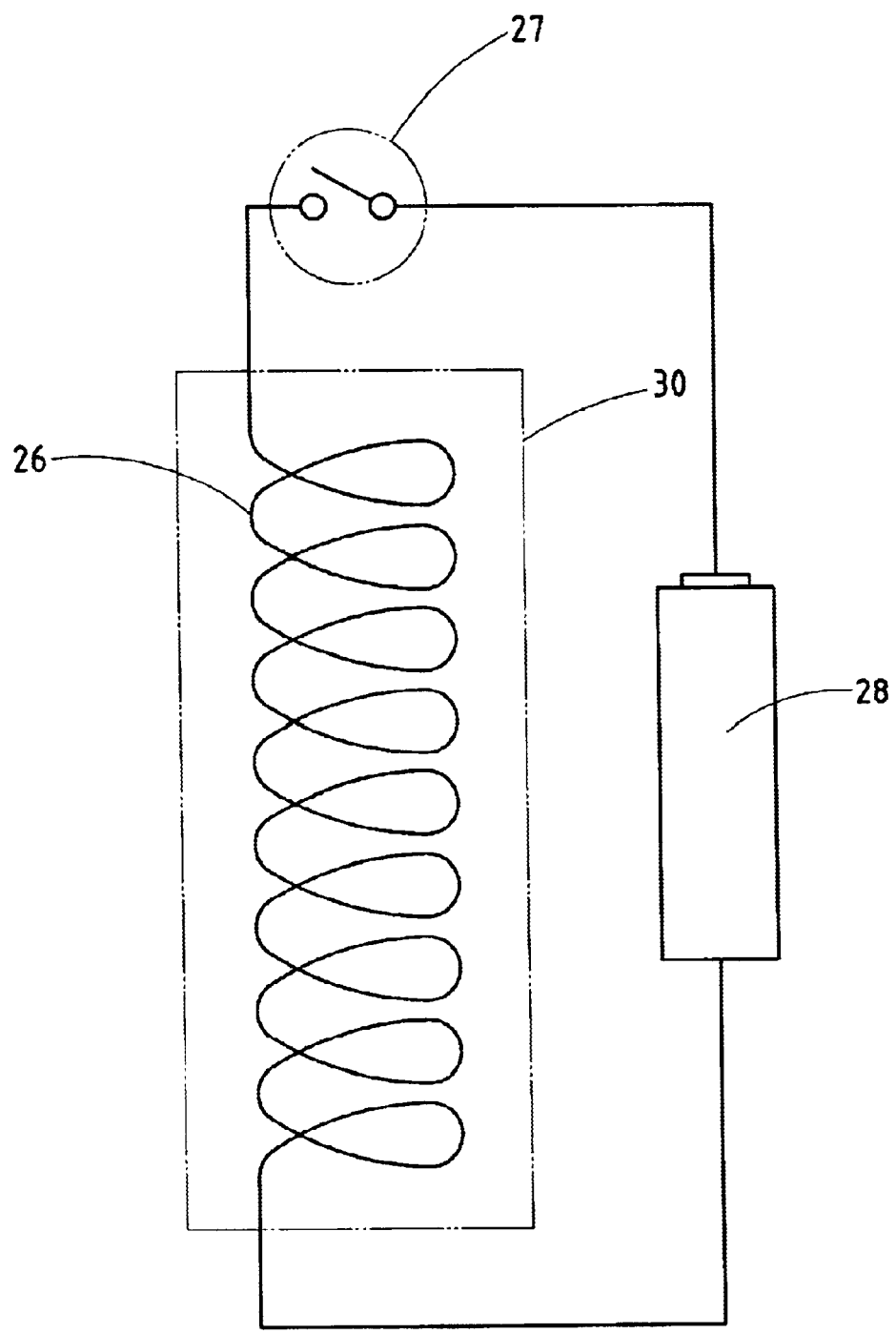
FIG. 4 shows a schematic view of a circuit of the present invention.

As shown in FIGS. 1–5, a protective device 20 embodied in the present invention comprises a main body 21, and a panel 30.

The main body 21 has a predetermined size and a predetermined thickness and is formed of two outer layers 23, an elastic layer 22 sandwiched between the two outer layers 23, a loop tape 24, and a hook tape 25 complementary to the loop tape 24. The loop tape 24 and the hook tape 25 can be pressed together or pulled apart for easy fastening and unfastening. As a result, the main body 21 can be easily attached to a shoulder harness 10 by the loop tape 24 and the hook tape 25 of the Velcro device which is also known as magic tape.

The panel 30 is attached to the outer surface of one of the outer layers 23 and is provided with a plurality of light-emitting bodies 26 and an attention-drawing mark 29. The light-emitting bodies 26 are regulated by a switch 27, and a battery set 28.

As shown in FIG. 1, the protective device 20 of the present invention is attached to the shoulder harness 10 such that the main body 21 of the device 20 is located diagonally across the chest of a driver. In light of the main body 21 being formed of the elastic layer 22, the main body 21 is capable of mitigating the bodily discomfort of the driver, which is caused mainly by the shoulder harness 10.

Figure 5:
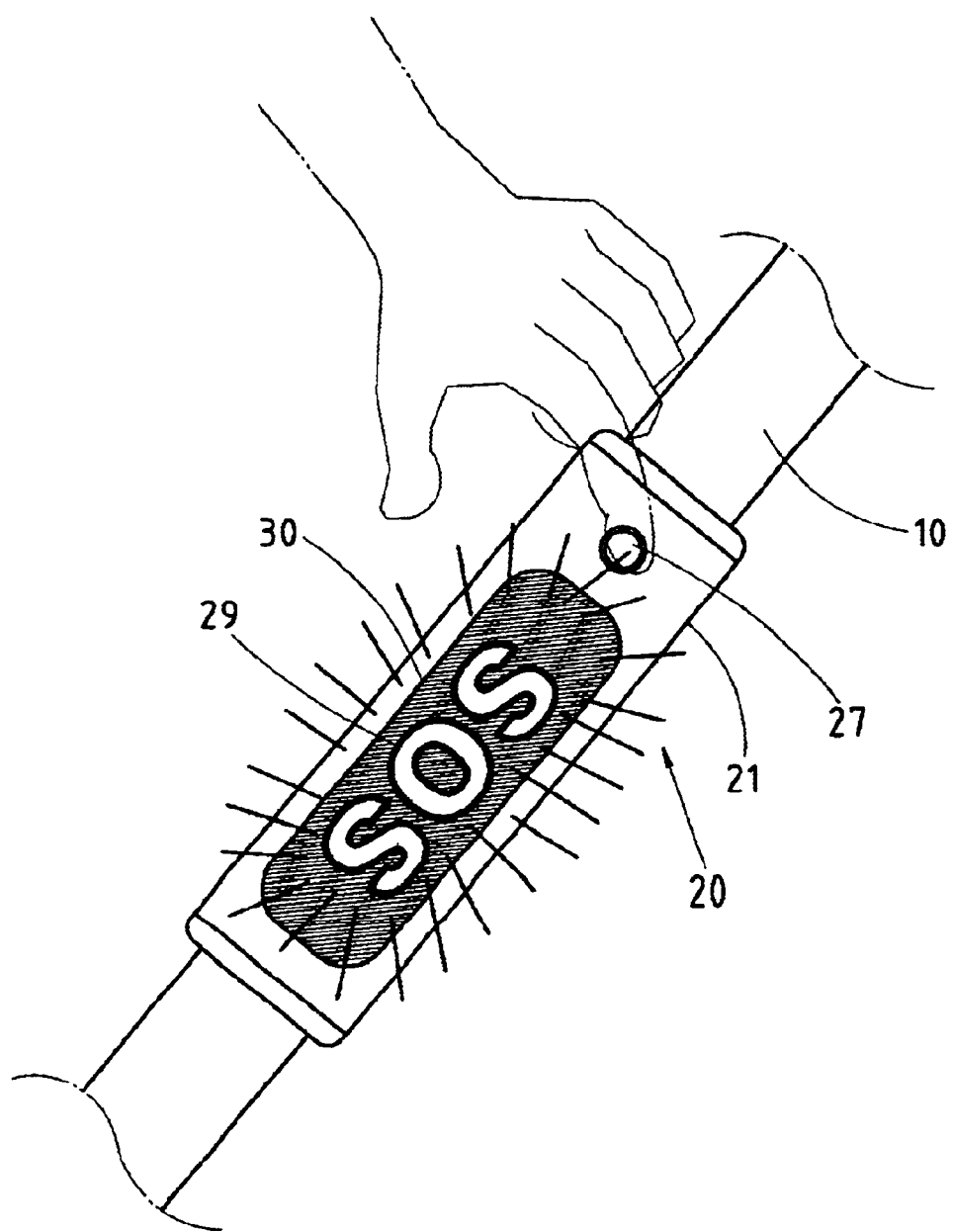
FIG. 5 shows a schematic view of the panel of the present invention in action.

In case of an emergency, the panel 30 of the protective device 20 of the present invention serves to draw attention so as to secure an assistance, as illustrated in FIG. 5.

The circuit of the present invention may be provided with an electronic control device by which the light-emitting bodies 26 are regulated to emit light in an intermittent fashion.

I claim:

1. A protective device for detachable attachment to a shoulder harness of a motor vehicle, the device comprising:

a main body formed of a pair of outer layers with an elastic layer sandwiched between said pair of outer layers, said main body having a strip of hook-and-loop material affixed along an edge thereof, said main body having a complementary strip of hook-and-loop material affixed along an opposite edge thereof, said strip of hook-and-loop material being engageable with said complementary strip of hook-and-loop material when said main body is wrapped around the shoulder harness;

a panel attached to an outer surface of one of said pair of outer layers, said panel having attention-drawing indicia formed thereon;

a light-emitting means affixed to said main body and positioned behind said attention-drawing indicia, said light-emitting means for illuminating said attention-drawing indicia; and a switch means electrically connected to said light-emitting means, said switch means affixed so as to extend outwardly of said outer surface of said one of said pair of outer layers, said switch means for allowing a passenger of the motor vehicle to selectively actuate said light-emitting means.

* * * * *